US005600999A

United States Patent [19]
Folino

[11] Patent Number: 5,600,999
[45] Date of Patent: Feb. 11, 1997

[54] SPEED CONVERTER WITH REVERSED OUTPUT

[75] Inventor: Frank A. Folino, Weston, Mass.

[73] Assignee: Synkinetics, Inc., Lowell, Mass.

[21] Appl. No.: 296,528

[22] Filed: Oct. 6, 1994

Related U.S. Application Data

[63] Continuation-in-part of Ser. No. 196,595, Feb. 14, 1994, abandoned, which is a continuation-in-part of Ser. No. 76,010, Jun. 11, 1993, abandoned, and Ser. No. 117,141, Sep. 14, 1993, abandoned.

[51] Int. Cl.$^6$ .............................. F16H 1/48; F16H 57/08
[52] U.S. Cl. ............................................. 74/122; 475/196
[58] Field of Search ...................... 475/196; 476/36, 476/67; 74/70, 23, 122

[56] References Cited

U.S. PATENT DOCUMENTS 4,476,735  10/1984  Cantwell ............................... 74/122 X

FOREIGN PATENT DOCUMENTS

| 133863 | 8/1984 | Japan | 475/196 |
|---|---|---|---|
| 168954 | 9/1985 | Japan | 475/196 |
| 1257331 | 9/1986 | U.S.S.R. | 475/196 |
| 1399548 | 5/1988 | U.S.S.R. | 475/196 |
| 1490362 | 6/1989 | U.S.S.R. | 475/196 |
| 1821597 | 6/1993 | U.S.S.R. | 475/196 |

*Primary Examiner*—Khoi Q. Ta

[57] ABSTRACT

Method and apparatus for translating a rotary input to a rotary output, the apparatus having a primary cam for providing a rotary input in a first direction, a secondary cam having a plurality of cycles, each cycle subtending a cycle angle of $\theta$, an intermediate member, the intermediate member having a plurality of radial slots, the slots separated from each other by a slot angle of $\beta$, where $\beta<\theta$, the slots being for receipt of respective interacting elements, wherein the primary cam has a rise side and a fall side and wherein each secondary cam cycle has a clockwise side and a counterclockwise side, and wherein the slot angle locates the slots such that the rise side of the primary cam interacts with the counterclockwise side of the secondary cam cycles, the primary and secondary cams for mounting on a common axis with the intermediate member and the cams and member interacting to provide a rotary output in a direction opposite to the first direction.

3 Claims, 6 Drawing Sheets

SPEED CONVERTER WITH REVERSED OUTPUT

This application is a continuation-in-part of U.S. patent application Ser. No. 08/196,595, filed Feb. 14, 1994, entitled: SPEED CONVERTER WITH DIRECTIONAL ELEMENT, which is a continuation-in-part in part of U.S. patent application Ser. No. 08/076 010, filed Jun. 11, 1993, now abandoned, entitled: HIGH EFFICIENCY VARIABLE OUTPUT SPEED CONVERTER and a continuation in part of now abandoned U.S. patent application Ser. No. 08/117,141, filed Sep. 10, 1993, entitled: SPEED CONVERTER all of the foregoing being incorporated herein by reference.

BACKGROUND OF THE INVENTION

The present invention relates to mechanical power transmissions, and more particularly, to speed reducers and the like.

Speed conversion is an important capability in the efficient utilization of rotary motive force. The occasion often arises for increasing or reducing of the speed of a drive member to a higher or lower speed at a driven member. In automobiles, for example, a hydraulic transmission, with various combinations of gear assemblies, accomplishes the task of translating the high rotary speed of the gasoline engine to the lower rotational requirements at the driven axle. Typically, such transmissions are quite complex, requiring many parts to operate in sophisticated syncopation, and are quite labor intensive for both assembly and service. Other speed conversion applications include elevators, where an electric motor typically is employed for lifting and lowering the elevator cab, and robotics, where an electric motor is employed as an actuator to effect motion. Typically in these applications, the speed reducer housing is mounted ("grounded") directly to the equipment housing. At times the effect of speed reduction is also referred to as torque amplification, and these concepts may be treated as interchangeable, for purposes of this disclosure.

It is therefore an object of the present invention to provide a speed converter which is simplified in nature but is robust in transmission capability.

It is a further object of the present invention to provide a speed converter which is relatively easy to assemble and service.

It is an additional object of the present invention to provide a speed converter design which is adaptable to a variety of situations.

SUMMARY OF THE INVENTION

These and other objects are well met by the presently disclosed, highly efficient, speed converting power transmission assembly of the present invention. The invention is applicable to an accelerating or decelerating input, whether clockwise or counter-clockwise rotating, but with an output rotation reversed from the input.

In a preferred embodiment, apparatus is provided for translating a rotary input to a rotary output, having a primary cam for providing a rotary input in a first direction, a secondary cam having a plurality of cycles, each cycle subtending a cycle angle of $\theta$, an intermediate member, the intermediate member comprising a plurality of radial slots, the slots separated from each other by a slot angle of $\beta$, where $\theta<\beta$, the slots for receipt of respective interacting elements, wherein the primary cam comprises a rise side and a fall side and wherein each secondary cam cycle comprises a rise side and a fall side, and wherein the slot angle locates the slots such that the rise side of the primary cam interacts with the fall side of the secondary cam cycles, the primary and secondary cams for mounting on a common axis with the intermediate member, the cams and member interacting to provide a rotary output in a direction opposite to the first direction.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF A PREFERRED EMBODIMENT

Figure 1:
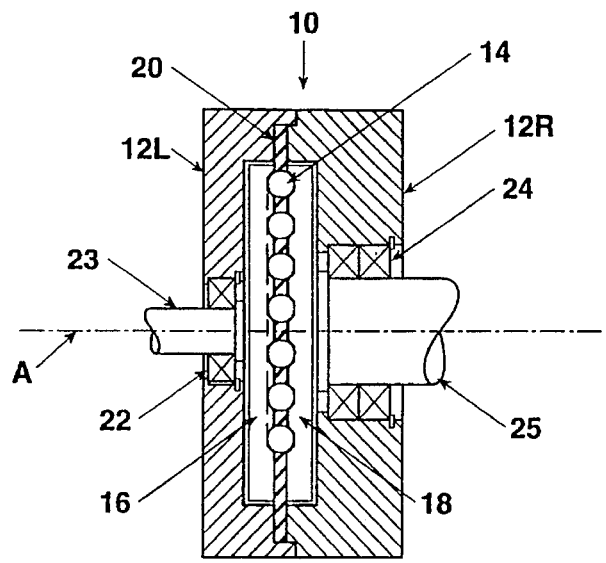
FIG. 1 is a sectional side view on the centerline of a single stage speed reducer according to an embodiment of the present invention.
Figure 2A:
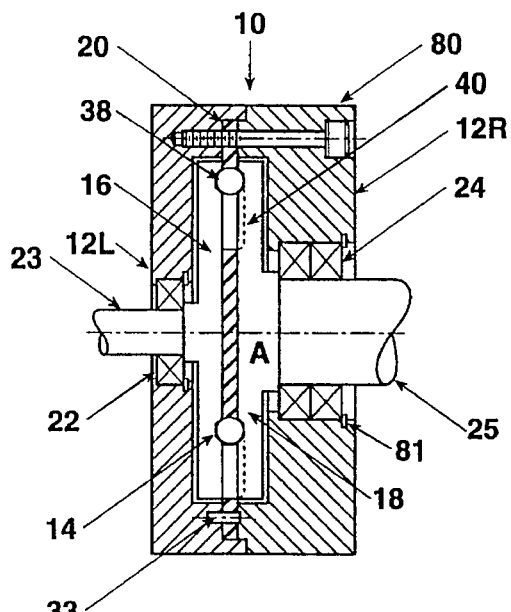
FIG. 2(a) is a sectional view on the centerline of FIG. 1, showing the top half of the reducer.
Figure 2B:
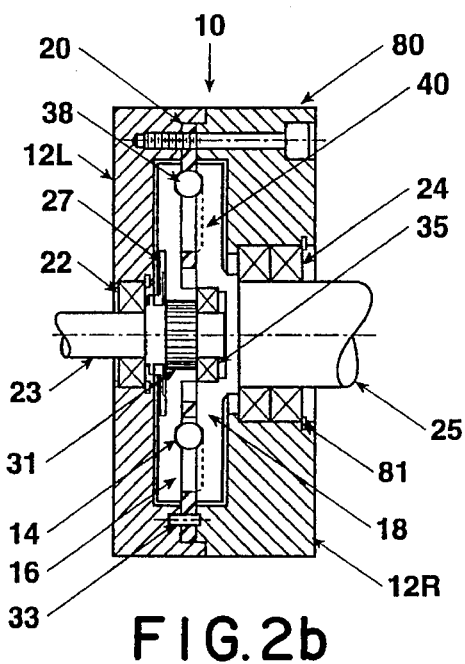
FIG. 2(b) is a sectional view on the centerline of FIG. 1 showing the top half in further detail.

A single-stage embodiment of the present invention is shown in FIG. 1 and 2. Speed reducer assembly 10 includes a housing 12(L, R), a plurality of balls 14, a primary i(drive) disk 16 coupled to an input shaft 23, a secondary disk 18 coupled to an output shaft 25, and an intermediate disk 20 coupled to housing 12. In this embodiment, the secondary disk is a driven disk. The drive disk is mounted in housing 12 by means of an input bearing or bushing 22 and the driven disk is mounted in housing 12 by means of output bearing or bushing 24. Preferably the drive disk and the driven disk are each coaxial about the drive axis A.

Idler bearing 35 provides a rotary structural support for the primary cam and shaft. This configuration couples the two shafts into a continuous shaft despite the fact that they are rotating at different speeds. Such an arrangement, as in FIG. 2(b), maintains shaft alignment and concentricity that sustains the precision performance of the reducer. The idler bearing may be eliminated, as in FIG. 2(a), by utilizing the cams and balls assembly as a bearing to maintain alignment and concentricity as well as structural shaft continuity. However, this arrangement would increase the ball and cam track loading and must be considered in determining the capacity of such a design.

Figure 3A:
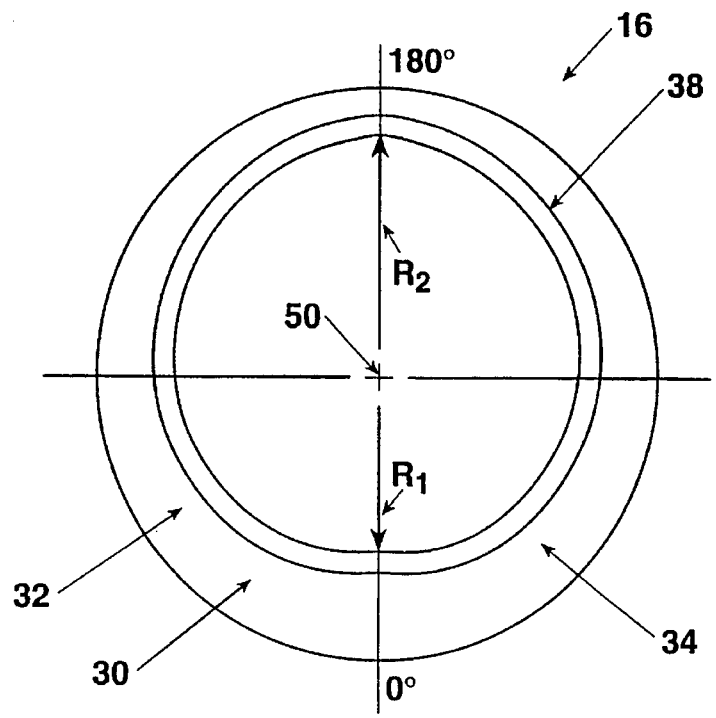
FIG. 3(a) is a plan view of a single cycle drive member face cam according to an embodiment of the present invention.
Figure 3B:
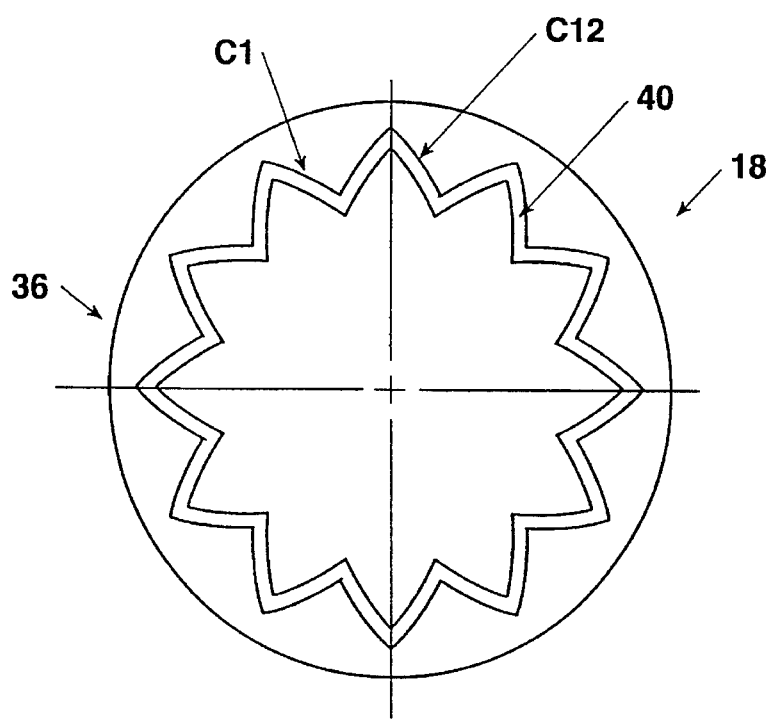
FIG. 3(b) is a plan view of a twelve cycle driven member face cam according to an embodiment of the present invention.

The speed reducing and power transmission capability of assembly 10 is achieved by use of appropriately designed face cams on each of the primary and secondary disks. The cams are interacted by the balls. FIGS. 3(a) and 3(b) are examples of two such cams.

As seen in FIG. 3(a), primary disk 16 includes a single cycle (single lobe) primary cam 30 which rises from R1 at 0 (to R2 at 180 ((defining the rise side 32 of the cam) and back to R1 at 360 ((defining the fall side 34 of the cam). The cam is asymmetric about the vertical centerline and is generated from R1 to R2 in a prescribed curve relative to the center 50. The cam forms a one cycle ball track 38.

As shown in FIG. 3(b), disk 18 is concentric to the shaft. In this embodiment, member 18 includes a 12 cycle (C1–C12) cam 36, taking the form of a concentric 12 cycle ball track 40. Each one of these 12 cycles accommodates the rise and fall of the single cycle primary cam, and each such accommodation rotates the secondary disk $\frac{1}{12}$ of a full revolution, in this embodiment.

Figure 4:
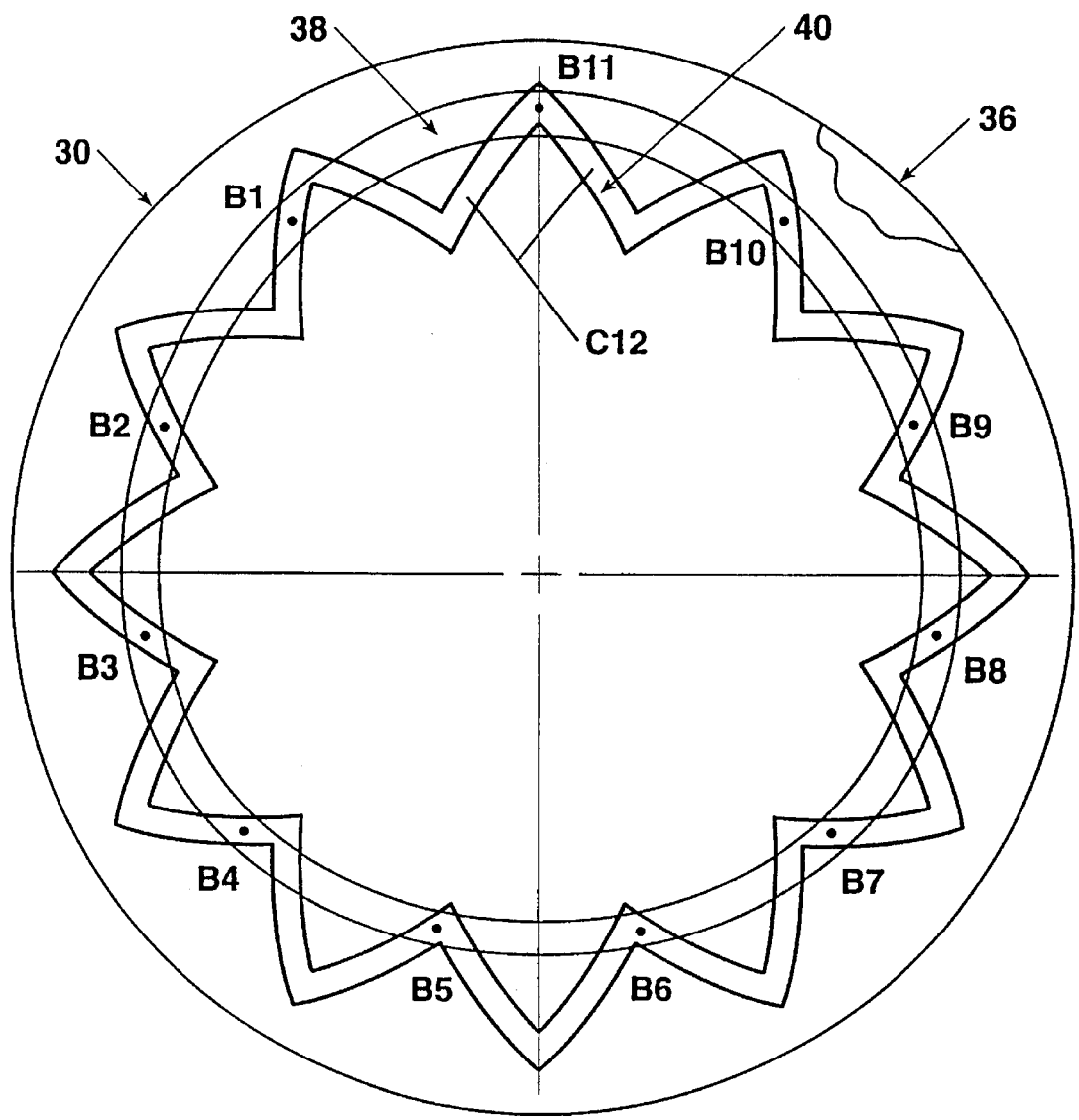
FIG. 4 is a conceptual overlay of the single cycle drive member of FIG. 3(a) and the twelve cycle driven member of FIG. 3(b).

The cooperation of the two cams of this embodiment is profiled in the overlay of FIG. 4. Cams 30 and 36, and specifically ball tracks 38, 40, are configured so as to support balls 14, FIG. 1, between them at locations B1 to B11. The balls are retained in these assigned locations by intermediate disk 20, as more particularly shown in FIG. 5(a). In this embodiment, the intermediate disk is provided with a plurality of radial ball travel slots S1–S11, each slot being placed equidistant, angle $\gamma$, from its nearest neighbors and concentric to center 50 of the intermediate disk.

Figure 5A:
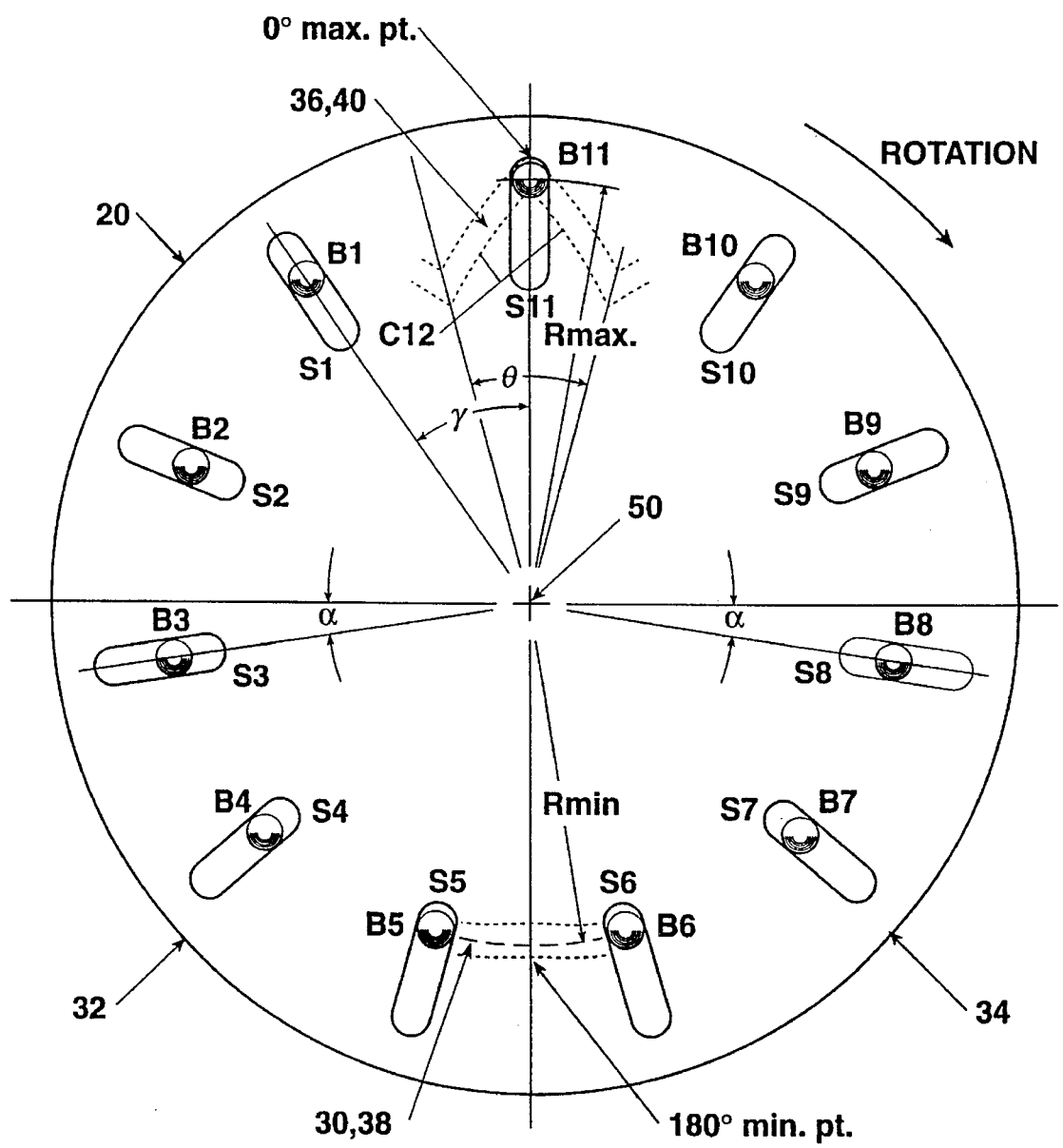
FIG. 5(a) is a plan view of a slotted intermediate disk with balls installed according to the embodiment of FIGS. 1–4.

The intermediate disk of FIG. 5(a) has several functions. The first is to provide a reaction to the rotary motive forces that are being transmitted through the balls. The intermediate disk is also utilized during the assembly procedure of the speed reducer in that it will locate and retain the balls in their proper orientation and alignment of the cams.

In operation, the balls 14 translate rotation of input shaft 23 and primary disk 16, FIG. 1, in a given direction (e.g., clockwise, as viewed from the input shaft), to a lower rotation of secondary disk 18 and output shaft 25 in the same direction. The balls move in and out radially during rotation of the cams. There is no angular rotation of the balls or the intermediate disk (intermediate disk 20) since the intermediate disk is structurally coupled, see pin 33, to the stationary housing 12, FIG. 2(a). The only rotating elements in this example are the primary and secondary cams/disks.

In U.S. patent application Ser. No. 08/117,141, filed Sep. 10, 1993, Attorney Docket Number FFG-001US, entitled: SPEED CONVERTER, incorporated by reference in U.S. patent application Ser. No. 087/196,595, filed Feb. 11, 1994, apparatus is taught for converting angular velocity and rotary motive force of an input drive device to angular velocity and rotary motive force of an output driven device. These input and output devices are disposed to be coupled together by and to interact via a plurality of interacting elements..The apparatus includes a conjugate pair of devices rotatable about a common axis, a first device of the pair being an input device having drive cam means for supply of angular velocity and rotary motive force to a second device of the pair, the second device being an output driven device having a driven cam means for receipt of the angular velocity and rotary motive force from the drive cam means.

Also taught in 08/117,141 is a means for translating. This translating means includes a retainer has a plurality of radial slots, each slot adapted to receive therein an assigned one of a plurality of interacting elements. A majority of the interacting elements comprises in-motion interacting elements as put in oscillatory motion in the slots by the drive cam means. The retainer is located between the conjugate pair about the common axis.

In 08/117,141, the drive cam means cooperates with the translating means and the driven cam means for transmitting the angular velocity and rotary motive force of the input device substantially equally and simultaneously through all the oscillating in-motion interacting elements, for obtaining the angular velocity and rotary motive force of the output driven device.

In 08/117,141, I set forth the following rules for optimal performance of the reducer, for the case of drive and driven cams rotating in the same direction. (I did not provide such rules for the case of drive and driven cams rotating in opposite directions.)

First, the number and locations of slots and balls is dependent on the number of lobes in the primary cam and the number of cycles in the secondary cam. Second, the angle separating the ball slots must be greater than the angle subtended by each of the driven cycles. Third, since only one ball can operate on any cycle of the secondary cam for a given cycle of the primary cam, the maximum number of balls used should be less than the number of cycles to prevent cam lock (less than 12 balls in this embodiment). The fourth law requires the slots to be oriented according to one fixed position of the two cams relative to each other. The fifth law is that the length of the slots in the intermediate disk must accommodate the rise and fall of the primary cam, which is equal to R2–R1 as a minimum. Sixth, in order to optimize load Sharing and rotary motion transmission, all balls in motion ideally must simultaneously produce essentially the same angular rotation of the secondary cam, at the appropriate speed reduction, for a given angular rotation of the primary cam.

Figure 5B:
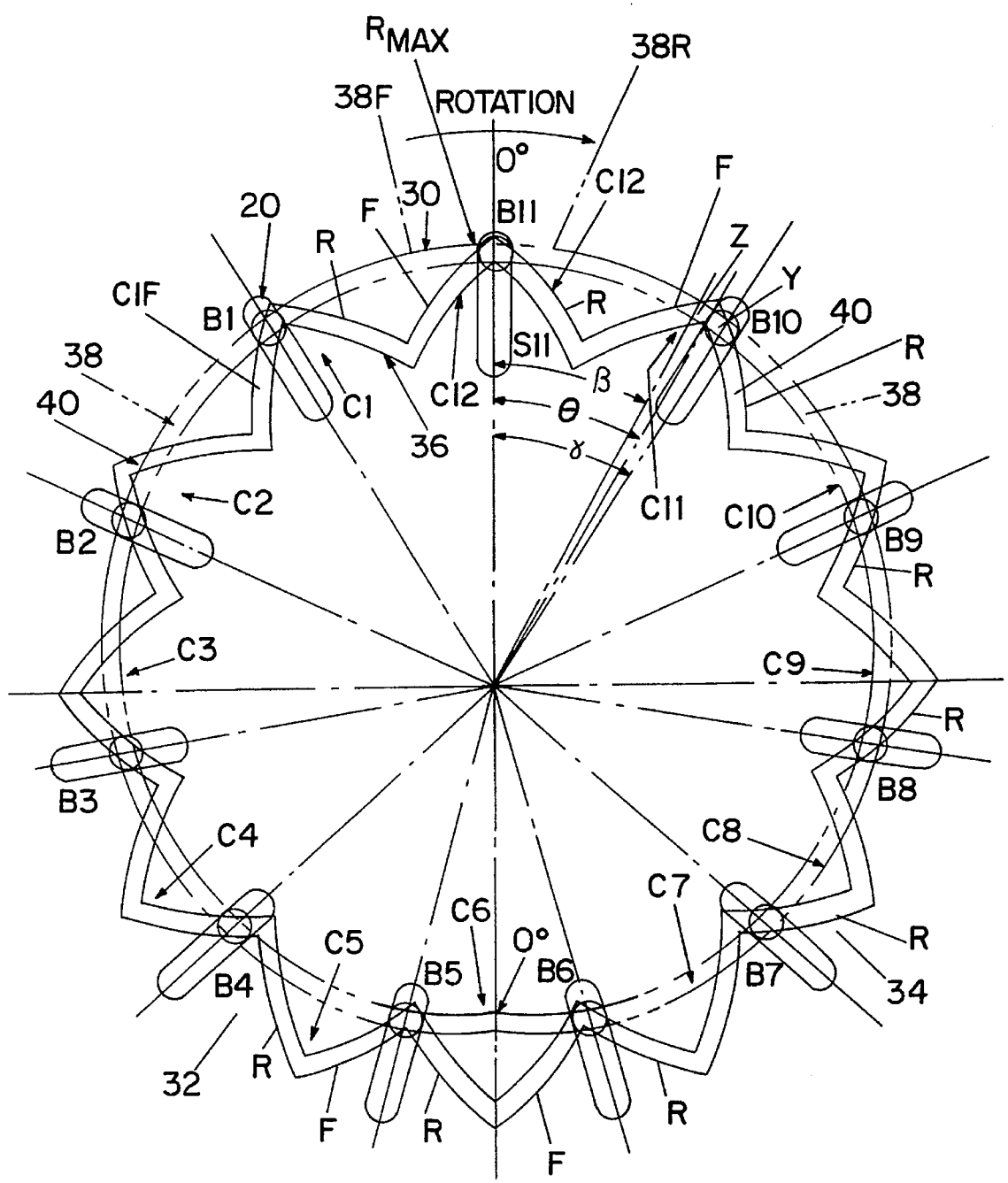
FIG. 5(b) is an overlay plan view of a single cycle primary cam, twelve cycle secondary cam and balls and slots of the intermediate disk according to an embodiment of the present invention.
Figure 6:
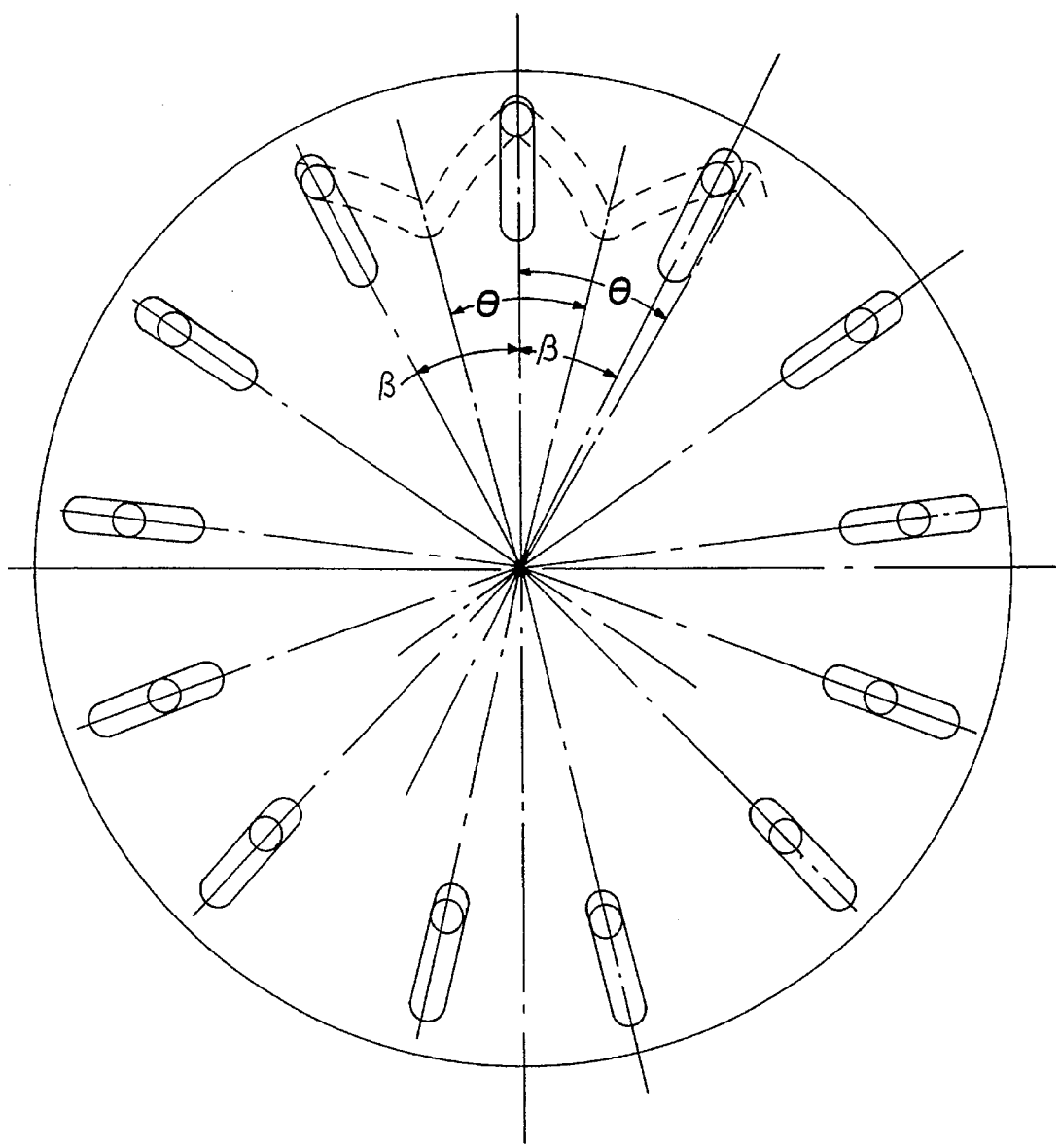
FIG. 6 is a plan view of a 13-slot intermediate disk with balls installed according to an embodiment of the invention.

These laws are satisfied by the overlaying the two cam tracks as shown in FIG. 5(b). In this embodiment, a 12 cycle cam having ball track 40 is overlaid over a one lobe (or cycle) primary cam having ball track 38. There are two points of intersection (Z,Y) at each of the 12 cycles of the secondary cam track 40. The subtended angle of these two points yields one angle $\beta$ less than 30° (angle $\theta$) and the other, $\gamma$, greater. By selecting the greater angle, slots S1–S11 can be located $\gamma$ degrees apart as in FIG. 5(a), thus producing a cam set where the drive and driven cams rotate in the same direction. Accordingly, up to 11 balls can be utilized in this cam set. I had thought that the maximum number of balls and slots is equal to the number of cycles in the driven cam minus the number of lobes in the drive cam, and find that this is true for the case of a non-reversing device.

Also in 08/117,141 it is stated that in a disclosed embodiment the cams are conjugate, in that the drive cam displaces all the balls radially in or out along the loci of interaction of the cams, an equal amount for a given angle of rotation. This displacement interaction produces the same linear velocity in the balls for every like angle of rotation, rotating the driven cam equally at all ball positions, wherein the amount of such rotation is proportional to the speed reduction ratio.

Application Ser. No. 08/196,595, filed 02/14/94, entitled "Speed converter with Directional Element", presents the cases of a cam set where the drive and driven cams rotate in the same direction and of a cam set where the drive and driven cams rotate in the opposite direction relative to each other. In the former case, a 12:1 non-reversing example is shown having 11 ball slots (FIG. 5); in the latter case, a 12:1 reversing reducer is shown in FIG. 8 of that application, where the number of balls (six) is less than that (eleven) of the non-reversing 12:1 cam set.

The present invention is based upon the realization that a reversing reducer can be made with greater slots than its non-reversing cousin, based upon an addition to the second rule so as to include the condition for the cam set where the drive and driven cams rotate in the direction opposite to each other. Hence, for this latter case: the slots will be separated by angle β, where β must be less than angle θ, so as to achieve opposite rotation.

Therefore, for this reversing configuration, a is computed as $$\beta = = \frac{360°}{\left(\begin{array}{c}\text{no. of cycles in}\\ \text{driven cam}\end{array}\right) + \left(\begin{array}{c}\text{no. of lobes in}\\ \text{drive cam}\end{array}\right)}$$

Thus for a single cycle drive cam and a twelve cycle driven cam, the slot separation angle β is computed as follows:

$$\beta = \frac{360}{12+1} = 27.69231°.$$

Now it is possible to create various direction-reversing configurations, and more importantly, it is possible to increase the number of balls in the device. Having extra balls has two possible benefits: either for the same torque throughput, the contact pressures between the balls and races will be reduced significantly, or it enables increasing the torque throughput for the same contact pressure.

It will now be appreciated that the intermediate disks indeed are direction-dictating. Various modifications of the specific embodiments set forth above are also within the spirit and scope of the invention. A device with other than constant angular velocity may be developed for special applications. Furthermore, use of relative terms such as clockwise and counter-clockwise is by way of example and not by way of limitation. The above examples and embodiments are provided by way of illustration and not by way of limitation of the scope of the present invention. It will be further appreciated that a speed converter made in accordance with the teachings of the present invention has a multiplicity of speed conversion and torque amplifier applications, including: automotive transmissions, robotics applications, elevation drives, and the like. The scope of the present invention is as set forth in the following claims.

What is claimed is:

1. Apparatus for converting a rotary input to a rotary output, the apparatus comprising:

a primary cam for providing a rotary input in a first direction, a secondary cam having a plurality of cycles, an intermediate member, the cams and intermediate member interacting to provide a rotary output in a second direction, the intermediate member comprising a plurality of slots, said slots separated from each other by a slot angle, the slots for receipt of respective interacting elements, wherein said cams form a conjugate pair of devices wherein their interaction through said interacting elements defines the centerline of each said slot, ones of said interacting elements comprising in-motion interacting elements and being put inlaid motion in said slots by said primary cam rotary input, said intermediate member being located with said conjugate pair about said common axis, and said primary cam cooperating with said intermediate member and said secondary cam for transmitting said rotary input substantially equally and simultaneously through all said oscillating in-motion interacting elements, for rotating said secondary cam as a driven device, wherein said primary cam and said secondary cam are defined as conjugate, wherein interaction of the conjugate cams displaces all of said oscillating interacting elements along the respective loci of the interaction of said cams and said oscillating elements, displacement of said oscillating interacting elements being an equal amount at every in-motion interacting element for each angle of rotation, said interaction producing the same linear velocity for each of said in-motion interacting elements for every said angle of rotation, said displacement for rotating said driven cam an equal angle at all interacting element positions that is proportional to the ratio of the number of cycles on the drive cam to the number of cycles on the driven cam, wherein each said secondary cam cycle subtends a cycle angle of θ and said slots are separated from each other by a slot angle of β, where θ>β, and wherein the primary cam has a cycle having a rise side and a fall side and wherein each secondary cam cycle comprises a rise side and a fall side, and wherein the slot angle locates the slots such that the rise side of the primary cam cycle interacts with the fall side of ones of the secondary cam cycles, wherein the secondary cam has N cycles, and the slot separation angle β is computed as follows:

$$\beta = \frac{360°}{1+N}.$$

2. The apparatus of claim 1 wherein the interacting elements comprise balls, the primary cam applying a drive force to the balls, wherein the intermediate member further comprises a reaction disk for reacting the drive force on the balls.

3. Apparatus of claim 2 wherein the primary cam consists of one said cycle having said rise side and fall side.

* * * * *

UNITED STATES PATENT AND TRADEMARK OFFICE
CERTIFICATE OF CORRECTION

PATENT NO. : 5,600,999
DATED : February 11, 1997
INVENTOR(S) : Frank A. Folino

It is certified that error appears in the above-identified patent and that said Letters Patent is hereby corrected as shown below:

Col 3, line 58, delete one of the two consecutive periods.
Col 4, line 54, "bails" should read --balls--.
Col. 6, line 8, "inlaid" should read --in said--.

Signed and Sealed this

Twentieth Day of October, 1998

Attest:

BRUCE LEHMAN

Attesting Officer

Commissioner of Patents and Trademarks